United States Patent
Hong

(10) Patent No.: US 12,262,329 B2
(45) Date of Patent: Mar. 25, 2025

(54) METHOD AND APPARATUS FOR UPLINK DATA TRANSMISSION, AND COMPUTER STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 340 days.

(21) Appl. No.: 17/759,005

(22) PCT Filed: Jan. 19, 2020

(86) PCT No.: PCT/CN2020/073048
§ 371 (c)(1),
(2) Date: Jul. 18, 2022

(87) PCT Pub. No.: WO2021/142847
PCT Pub. Date: Jul. 22, 2021

(65) Prior Publication Data
US 2023/0043225 A1    Feb. 9, 2023

(51) Int. Cl.
*H04W 52/00*    (2009.01)
*H04W 52/04*    (2009.01)
(Continued)

(52) U.S. Cl.
CPC ....... *H04W 52/146* (2013.01); *H04W 52/365* (2013.01); *H04W 72/1268* (2013.01); *H04W 72/23* (2023.01)

(58) Field of Classification Search
CPC ............. H04W 52/146; H04W 52/365; H04W 72/1268; H04W 72/23; H04W 72/51; H04W 52/18; H04W 52/54
(Continued)

(56) References Cited

U.S. PATENT DOCUMENTS 9,107,175 B2 *   8/2015   Kim .................. H04W 72/21
9,185,666 B2    11/2015   Ho et al.
(Continued)

FOREIGN PATENT DOCUMENTS

CN    103314622 A    9/2013
CN    105392193 A    3/2016
(Continued)

OTHER PUBLICATIONS

International Search Report issued Oct. 21, 2020 in PCT/CN2020/073048, filed on Jan. 19, 2020, 3 pages.
(Continued)

*Primary Examiner* — Andrew Wendell
(74) *Attorney, Agent, or Firm* — Oblon, McClelland, Maier & Neustadt, L.L.P.

(57) ABSTRACT

A method for uplink data transmission. The method is applicable to user equipment (UE), and includes: reporting maximum allowed power reduction (P-MPR) information to a base station, wherein the P-MPR information is used to indicate a maximum power reduction supported by the UE in a current communication frequency band; receiving scheduling information returned by the base station based on the P-MPR information; and transmitting uplink data according to the scheduling information.

20 Claims, 6 Drawing Sheets

| R | R |   | PH (Type 1, PCell) |
|---|---|---|---|
| R | R |   | $P_{CMAX,f,c}$ |
| R | R | R | P-MPR |

(51) Int. Cl.
　　*H04W 52/14* (2009.01)
　　*H04W 52/36* (2009.01)
　　*H04W 72/1268* (2023.01)
　　*H04W 72/23* (2023.01)

(58) Field of Classification Search
　　USPC .......................................................... 455/522
　　See application file for complete search history.

(56) References Cited

U.S. PATENT DOCUMENTS

| | | | |
|---|---|---|---|
| 2012/0281568 | A1 | 11/2012 | Ho et al. |
| 2015/0271824 | A1* | 9/2015 | Zhang ................ H04W 52/367 |
| | | | 370/329 |
| 2017/0230960 | A1* | 8/2017 | Frank .................... H04W 72/21 |
| 2019/0021060 | A1* | 1/2019 | Isogawa .............. H04W 52/367 |
| 2019/0082398 | A1* | 3/2019 | Loehr ................... H04W 72/21 |
| 2020/0163031 | A1* | 5/2020 | Loehr ................... H04W 72/23 |
| 2020/0229104 | A1* | 7/2020 | MolavianJazi ..... H04W 52/367 |
| 2021/0037481 | A1* | 2/2021 | Kim ...................... H04W 72/54 |
| 2021/0211999 | A1* | 7/2021 | Zhang ................. H04W 52/367 |

FOREIGN PATENT DOCUMENTS

| | | |
|---|---|---|
| CN | 105939538 A | 9/2016 |
| CN | 107105495 A | 8/2017 |

OTHER PUBLICATIONS

Apple Inc., "Further considerations on the uplink duty cycle enhancements for the MPE scenario", 3GPP RAN WG4 Meeting #93, Nov. 2019, R4-1913530, 10 pages.

Qualcomm Incorporated, "P-MPR and headroom reporting for MPE", 3GPP TSG-RAN WG4 Meeting #93, Nov. 2019, R4-1913230, 5 pages.

Intel Corporation, "Solution enhancements to mitigate link failures in FR2" 3GPP RAN4 WG Meeting #92Bis, Oct. 2019, R4-1912287, 3 pages.

Ericsson, Sony, "Views on MPE", 3GPP TSG-RAN WG4 Meeting #92-Bis, Oct. 2019, R4-1912319, 3 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2 V16.2.0 (Dec. 2019), Dec. 2019, 157 pages.

Office Action issued Feb. 15, 2023, in corresponding Chinese Patent Application No. 202080000127.7 (with English Translation), 23 pages.

Samsung, "Issues on PHR trigger based on power management", 3GPP TSG-RAN2#74 meeting, Tdoc R2-113269, Barcelona, Spain, May 9-13, 2011, 6 pages.

Jia Liu, "SAR Evaluation Considerations for LTE Devices", Digital Communication World, No. 11, Nov. 1, 2013, 5 pages. (Submitted with Abstract Machine Translation).

Written Opinion of International Search Report issued Oct. 21, 2020, in PCT/CN2020/073048 (with English Translation), 6 pages.

Combined Chinese Office Action and Search Report issued Sep. 19, 2022, in corresponding Chinese Patent Application No. 202080000127.7 (with English Translation and English Translation of Category of Cited Documents), 22 pages.

Apple Inc., "Further considerations on the uplink duty cycle enhancements for the MPE scenario", 3GPP RAN WG4 Meeting #92bis, R4-1911505, (revision of R4-1908021), Chongqing, China, Oct. 14-18, 2019, 9 pages.

* cited by examiner

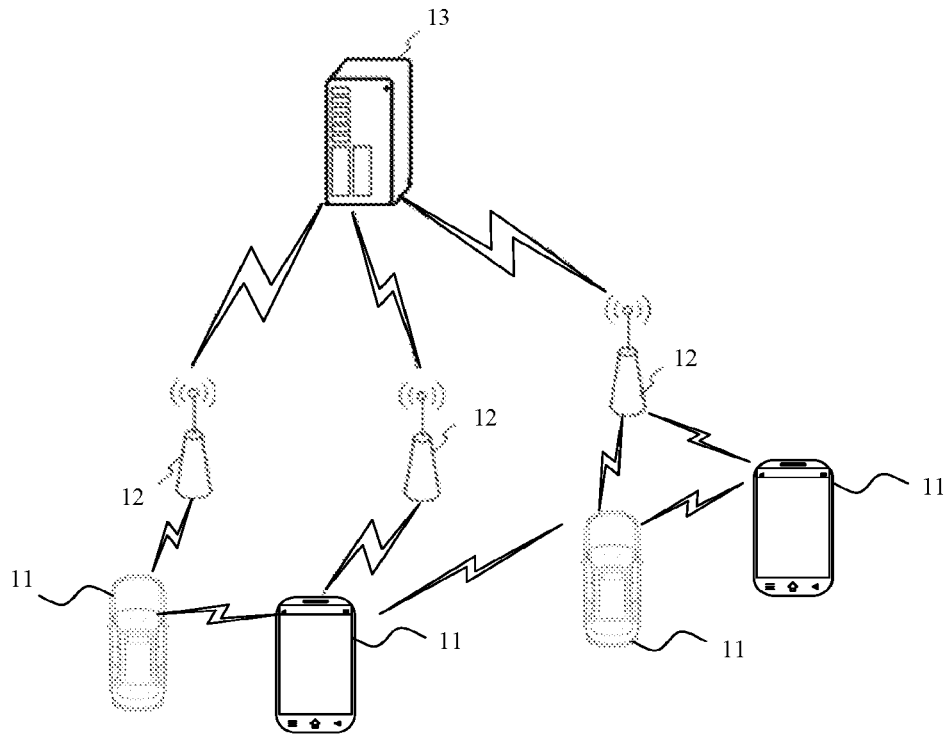

FIG. 1

| Report the maximum allowed power back-off information to a base station, the maximum allowed power back-off information being used for indicating the maximum power back-off supported by a User Equipment (UE) in the current communication frequency band | S11 |

| Receive scheduling information returned by the base station on the basis of the maximum allowed power back-off information | S12 |

| Send uplink data according to the scheduling information | S13 |

FIG. 2

METHOD AND APPARATUS FOR UPLINK DATA TRANSMISSION, AND COMPUTER STORAGE MEDIUM

CROSS REFERENCE TO RELATED APPLICATIONS

This application is the national phase of International Application No. PCT/CN2020/073048 filed on Jan. 19, 2020, the disclosure of which is hereby incorporated by reference in its entirety.

TECHNICAL FIELD

The present disclosure relates to communication technologies, and in particular to methods and apparatuses for uplink data transmission and computer storage medium.

BACKGROUND

Electromagnetic radiation from terminals may have a negative impact of human body. In particularly, with the upcoming commercialization of fifth generation mobile communication technologies (5th generation mobile networks or 5th generation wireless systems, referred to as 5G), terminals supporting high frequency and high power will occupy mainstream in the market, which also objectively increases the risk of the electromagnetic radiation from the terminals on the safety of human body.

Internationally, a specific absorption rate (SAR) and a maximum permissible exposure (MPE) are used to represent an electromagnetic radiation standard of the terminal on the safety of human body. Herein, the SAR is mainly aimed at a low frequency band, while the MPE is mainly aimed at a millimeter wave frequency band.

In the related art, in order to reduce the effect of terminal transmission on the safety of human body, it is common to perform a certain power reduction based on a transmission power or reduce an uplink duty cycle of the terminal transmission to meet requirements of the SAR or the MPE. However, in the millimeter wave frequency band, since a beam is narrow and radiation is relatively concentrated, once the beam faces a human body, a power reduction up to 20 dB may be required to meet the requirements of the MPE. Such a great power reduction may cause serious insufficient uplink coverage, and even cause sudden failure of a communication link.

SUMMARY

The present disclosure provides a method and apparatus for uplink data transmission and a computer storage medium.

According to a first aspect of the present disclosure, there is provided a method for uplink data transmission, performed by a user equipment (UE), including:
reporting maximum power reduction (P-MPR) information to a base station, wherein the P-MPR information is configured to indicate a maximum power backoff supported by the UE in a current communication frequency band;
receiving scheduling information sent by the base station based on the P-MPR information; and
transmitting uplink data according to the scheduling information.

According to a second aspect of the present disclosure, there is provided a method for uplink data transmission, performed by a base station, including:
receiving maximum power reduction (P-MPR) information reported by a user equipment (UE), wherein the P-MPR information is configured to indicate a maximum power backoff supported by the UE in a current communication frequency band;
determining an uplink duty cycle according to the P-MPR information;
returning scheduling information to the UE according to the uplink duty cycle; and
receiving uplink data transmitted by the UE according to the scheduling information.

According to a third aspect of the present disclosure, there is provided an apparatus for uplink data transmission, including:
a processor; and
a memory for storing executable instructions,
wherein the processor is configured to, by executing the executable instructions, implement the method for uplink data transmission provided by any technical solution applied in the UE side.

According to a fourth aspect of present disclosure, there is provided an apparatus for uplink data transmission, including:
a processor; and
a memory for storing executable instructions,
wherein the processor is configured to, by executing the executable instructions, implement the method for uplink data transmission provided by any technical solution applied in the base station side.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic structural diagram illustrating a radio communication system according to an exemplary embodiment.

FIG. 2 is a flowchart illustrating a method for uplink data transmission according to an exemplary embodiment.

DETAILED DESCRIPTION OF THE EMBODIMENTS

Figure 3:
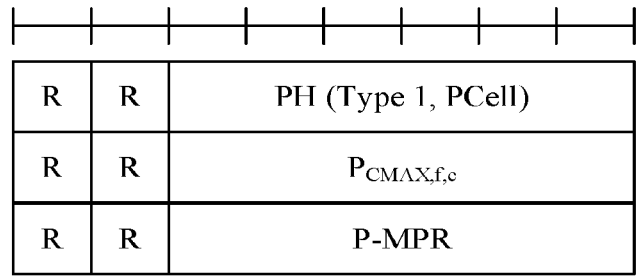
FIG. 3 is a schematic diagram illustrating a report format of P-MPR information according to an exemplary embodiment.

Exemplary embodiments will be described in detail here, examples of which are illustrated in the accompanying drawings. When the following description refers to the drawings, unless otherwise indicated, the same numerals in different drawings indicate the same or similar elements. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be adopted to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

Referring to FIG. 1, which is a schematic structural diagram illustrating a radio communication system according to an embodiment of the present disclosure. As shown in FIG. 1, the radio communication system is a cellular mobile communication technology-based communication system, and the radio communication system may include several terminals 11 and several base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal such as a sensor device, a mobile phone (or referred to as a "cellular" phone), and a computer having the IoT terminal. For example, the terminal 11 may be a fixed, portable, pocket-sized, handheld, computer-built-in, or vehicle-mounted device, for example, a Station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be an unmanned aerial vehicle device. Alternatively, the terminal 11 may also be a vehicle-mounted device, for example, a trip computer with a wireless communication function, or a wireless communication device connected to the trip computer. Alternatively, the terminal 11 may also be a roadside device, for example, a street lamp, a signal lamp, or other roadside devices with a wireless communication function.

The base station 12 may be a network side device in a radio communication system. The radio communication system may be a fourth generation mobile communication technology (4th generation mobile communication, 4G) system, which is also referred to as a Long Term Evolution (LTE) system. Alternatively, the radio communication system may also be a 5G system, which is also referred to as a new radio (NR) system or a 5G NR system. Alternatively, the radio communication system may be a next generation system of the 5G system, wherein an access network in the 5G system can be called a New Generation-Radio Access Network (NG-RAN); or, a Machine-Type Communication (MTC) system.

The base station 12 may be an evolved NodeB (eNB) in the 4G system. Alternatively, the base station 12 may also be a base station (gNB) having a centralized-distributed architecture in the 5G system. When the base station 12 adopts a centralized-distributed architecture, the base station 12 typically includes a Central Unit (CU) and at least two Distributed Units (DUs). Protocol stacks of a Packet Data Convergence Protocol (PDCP) layer, a Radio Link Control (RLC) layer, and a Media Access Control (MAC) layer are set in the central unit. A protocol stack of a Physical (PHY) layer is set in the distributed unit, and the specific implementation of the base station 12 is not limited in the embodiments of the present disclosure.

A wireless connection may be established between the base station 12 and the terminal 11 through a radio air interface. In various embodiments, the radio air interface is a radio air interface based on based on the fourth generation mobile communication network technology (4G) standard; alternatively, the radio air interface is a radio air interface based on the fifth generation mobile communication network technology (5G) standard. For example, the radio air interface is the New Radio; alternatively, the radio air interface may be a radio air interface based on the next generation mobile communication network technical standard of 5G.

In some embodiments, an End to End (E2E) connection may also be established among the terminals 11. For example, a Vehicle to Vehicle (V2V) communication, a Vehicle to Infrastructure (V2I) communication, and a Vehicle to Pedestrian (V2P) communication in a Vehicle to Everything (V2X) communication, and other scenarios.

In some embodiments, the above radio communication system may further include a network management device 13.

Several base stations 12 are respectively connected to the network management device 13. Herein, the network management device 13 may be a core network device in a radio communication system. For example, the network management device 13 may be a Mobility Management Entity (MME) in an Evolved Packet Core (EPC). Alternatively, the network management device may also be other core network devices, such as a Serving Gate Way (SGW), a Public Data Network Gate Way (PGW), a Policy and Charging Rules Function (PCRF), or a Home Subscriber Server (HSS). The implementation of the network management device 13 is not limited by the embodiments of the present disclosure.

Internationally, a specific absorption rate (SAR) and a maximum permissible exposure (MPE) are used to represent an electromagnetic radiation standard of the terminal on the safety of human body. Herein, the SAR is mainly aimed at a low frequency band, while the MPE is mainly aimed at a millimeter wave frequency band.

In the related art, in order to reduce the effect of terminal transmission on the safety of human body, it is usually used to perform a certain power reduction based on a transmission power or reduce an uplink duty cycle of the terminal transmission to meet requirements of the SAR or the MPE. For example, in the 3GPP TS38.101-2 radio frequency standard, a maximum allowed UE output power reduction (referred to as P-MPR) is specially introduced, which requires the terminal to report a maximum duty cycle capability. When a scheduled uplink duty cycle is larger than a maximum uplink duty cycle, the terminal reduces a transmission level or a transmission power. The above method is very effective to meet the requirements of the SAR for low frequency. However, in the millimeter wave frequency band, since a beam is narrow and radiation is relatively concentrated, once the beam faces a human body, a power reduction up to 20 dB may be required to meet the requirements of the MPE. Such a great power reduction may cause serious insufficient uplink coverage, and even cause sudden failure of a communication link.

For the above-mentioned wireless communication system, in order to solve the existing problem of serious insufficient uplink coverage and even failure of the communication link, which is caused by a relatively great power reduction for UE supporting the millimeter wave frequency band to meet the requirements of the MPE, various embodiments of the disclosed method are proposed.

FIG. 2 is a flowchart illustrating a method for uplink data transmission according to an exemplary embodiment. As shown in FIG. 2, the method for uplink data transmission is performed by a user equipment (UE) and includes following steps.

In step S11, maximum power reduction (P-MPR) information is reported to a base station, wherein the P-MPR information is configured to indicate a maximum power backoff supported by the UE in a current communication frequency band.

In step S12, scheduling information sent by the base station based on the P-MPR information is received.

In step S13, uplink data is transmitted according to the scheduling information.

According to the technical solution described in the embodiment of the present disclosure, the base station can determine the scheduling information for the UE according to the P-MPR information reported by the UE, so that the UE can transmit the uplink data according to the scheduling information, thereby facilitating the UE to meet the requirements of the MPE more easily. Compared with the existing solution in which UE does not report the P-MPR information, the technical solution described in the present disclosure can avoid the problems of serious insufficient uplink coverage and even sudden failure of the communication link caused by the relatively great power reduction, which is determined by the base station without knowing the maximum power reduction of the UE.

In some embodiments, the P-MPR information includes a P-MPR value. That is, the UE can report the P-MPR value to the base station when reporting the P-MPR information to the base station, so that the base station can determine the scheduling information according to the P-MPR value.

In some embodiments, the P-MPR information includes a difference between the P-MPR value and a reference power reduction value. That is, the UE can report the difference between the P-MPR value and the reference power reduction value to the base station when reporting the P-MPR information to the base station, so that the base station can determine the scheduling information according to the difference.

In some embodiments, reporting the P-MPR information to the base station includes reporting the P-MPR information to the base station with a power headroom reporting (PHR) message which carries the P-MPR information. In this way, signaling overhead can be saved by reporting the P-MPR information through the PHR message.

In some embodiments, reporting the P-MPR information to the base station includes adding a perset information field carrying the P-MPR information in the PHR message.

The perset information field includes:
an information bit for indicating a P-MPR value or a difference between a P-MPR value and a reference power reduction value; and
a reserved bit.

In some embodiments, reporting the P-MPR information to the base station includes periodically reporting the P-MPR information to the base station. In this way, the UE can report the P-MPR information to the base station in a periodic reporting manner.

In some embodiments, reporting the P-MPR information to the base station includes reporting the P-MPR information to the base station in a case where a preset trigger event is satisfied. In this way, the UE can report the P-MPR information to the base station in a trigger reporting manner.

In an implementation, the preset trigger event includes: a P-MPR value included in the P-MPR information is larger than or equal to a first preset threshold.

As an example, the first preset threshold is a fixed value.

As an example, the first preset threshold is the reference power reduction value.

The reference power reduction value is determined according to a maximum power reduction value $MPR_{f,e}$ satisfying a first transmission requirement of a current carrier and a cell, a maximum power reduction value $A\text{-}MPR_{f,e}$ satisfying a second transmission requirement of the current carrier and the cell, and a power reduction value scaling factor $\Delta MB_{P,n}$ for the current communication frequency band in a plurality of supported frequency bands.

Here, the first transmission requirement can be understood as a general requirement specified in a communication standard, that is, a requirement that all UEs must meet if there is no special requirement given by network signaling (NS).

Here, the second transmission requirement can be understood as a transmission requirement given by the network signaling.

As an example, a calculation formula of the reference power reduction value is:

$$\max(MPR_{f,e}, A\text{-}MPR_{f,e}) + \Delta MB_{P,n},$$

where $MPR_{f,e}$ represents the maximum power reduction value satisfying the first transmission requirement of the current carrier and the cell, $A\text{-}MPR_{f,e}$ represents the maximum power reduction value satisfying the second transmission requirement of the current carrier and the cell, $\Delta MB_{P,n}$ represents the power reduction value scaling factor for the current communication frequency band in a plurality of supported frequency bands, f represents a subcarrier, c represents the cell, n represents the frequency band, and P represents an effective isotropic radiated power (EIRP) peak value when the frequency band is n.

In some embodiments, the preset trigger event includes: a difference between the P-MPR value and a reference power reduction value is larger than or equal to a second preset threshold.

As an example, the second preset threshold is a fixed value.

As an example, the second preset threshold is the reference power reduction value.

A calculation formula of the difference is:

$$P\text{-}MPR-(\max(MPR_{f,e}, A\text{-}MPR_{f,e})+\Delta MB_{P,n}),$$

where P-MPR represents the P-MPR value, $\max(MPR_{f,e}, A\text{-}MPR_{f,e})+\Delta MB_{P,n}$ represents the reference power reduction value.

$MPR_{f,e}$ represents the maximum power reduction value satisfying the first transmission requirement of the current carrier and the cell, $A\text{-}MPR_{f,e}$ represents the maximum power reduction value satisfying the second transmission requirement of NS of the current carrier and the cell, $\Delta MB_{P,n}$ represents the power reduction value scaling factor for the current communication frequency band in a plurality of supported frequency bands, f represents a subcarrier, c represents the cell, n represents the frequency band, and P represents the EIRP peak value when the frequency band is n.

According to the technical solution described in the present disclosure, the UE reports the P-MPR information to the base station, wherein the P-MPR information is configured to indicate the maximum power reduction supported by the UE in the current communication frequency band, receives the scheduling information sent by the base station based on the P-MPR information and transmits the uplink data according to the scheduling information. In this way, the base station can determine the scheduling information for the UE according to the P-MPR information reported by the UE, so that the UE can transmit the uplink data according to the scheduling information, thereby facilitating the UE to meet the requirements of the MPE more easily. Compared with the existing solution in which UE does not report the P-MPR information, the technical solution described in the present disclosure can avoid the problems of serious insufficient uplink coverage and even sudden failure of the communication link caused by the relatively great power reduction, which is determined by the base station without knowing the maximum power reduction of the UE.

The report of the P-MPR information is added on the basis of the existing PHR report format, and a report format of the P-MPR information is shown in FIG. 3. In FIG. 3, the first two lines are existing methods, wherein PH represents a power head room (PHR), T1 represents Type 1, which is aimed at a single primary carrier; PCell represents a primary cell; and $P_{CMAX,f,e}$ represents a maximum power configured by a cell c on a carrier f, see TS38.321 for details. In FIG. 3, the last line is newly added P-MPR information. Specifically, the P-MPR value occupies 8 bits, of which R is used as the reserved bit, and the remaining bits are used to report the P-MPR value. For example, the P-MPR value is represented by 6 bits, and a mapping relationship between the P-MPR value and an actual value in the PHR message is shown in Table 1.

TABLE 1

| P-MPR | P-MPR Level |
|---|---|
| 0 | P-MPR_0 |
| 1 | P-MPR_1 |
| 2 | P-MPR_2 |
| 3 | P-MPR_3 |
| ... | ... |
| 60 | P-MPR_60 |
| 61 | P-MPR_61 |
| 62 | P-MPR_62 |
| 63 | P-MPR_63 |

Figure 4:
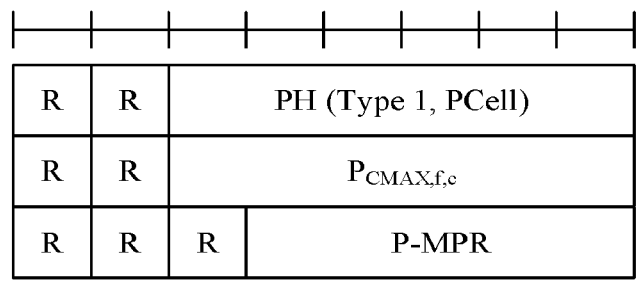
FIG. 4 is a schematic diagram illustrating another report format of P-MPR information according to an exemplary embodiment.

The report of the P-MPR information is added on the basis of the existing PHR report format, and another report format of the P-MPR information is shown in FIG. 4. In FIG. 4, the first two lines are existing methods, see TS38.321 for details. In FIG. 4, the last line is newly added P-MPR information. Specifically, the P-MPR value occupies 8 bits, of which R is used as the reserved bit, and the remaining bits are used to report the P-MPR value. For example, the P-MPR value is represented by 5 bits, and a mapping relationship between the P-MPR value and an actual value in the PHR message is shown in Table 2.

TABLE 2

| P-MPR | P-MPR Level |
|---|---|
| 0 | P-MPR_0 |
| 1 | P-MPR_1 |
| 2 | P-MPR_2 |
| 3 | P-MPR_3 |
| ... | ... |
| 28 | P-MPR_28 |
| 29 | P-MPR_29 |
| 30 | P-MPR_30 |
| 31 | P-MPR_31 |

Figure 5:
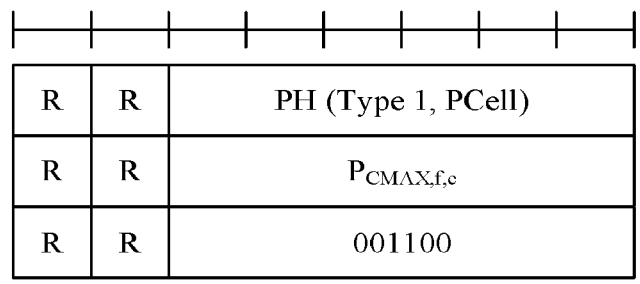
FIG. 5 is a schematic diagram illustrating a report format with a granularity of 0.5 dB and a P-MPR value of 6 dB according to an exemplary embodiment.
Figure 6:
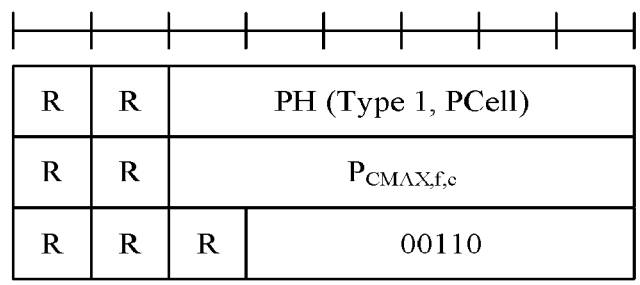
FIG. 6 is a schematic diagram illustrating a report format with a granularity of 1 dB and a P-MPR value of 6 dB according to an exemplary embodiment.

In a certain communication, the UE determines the P-MPR value required by a beam according to a sensor and a usage scenario, for example, the P-MPR value=6 dB. The UE reports the P-MPR value to the base station together when reporting the PHR value. Taking 0.5 dB as a granularity and the P-MPR value-6 dB as an example, if the P-MPR value is 6 bits in the report format of the P-MPR information, the P-MPR value=6 dB can correspond to P-MPR_12 in Table 1, and a representation of the bit is shown in FIG. 5, that is, the P-MPR value=6 dB is represented as 001100. Taking 1 dB as the granularity and the P-MPR value-6 dB as an example, if the P-MPR value is 5 bits in the report format of the P-MPR information, the P-MPR value=6 dB can correspond to P-MPR_6 in Table 2, and a representation of the bit is shown in FIG. 6, that is, P-MPR value=6 dB is represented as 00110.

In a certain communication, the UE determines the P-MPR value required by the beam according to a service type and the usage scenario, for example, P-MPR=6 dB. The UE determines $\max(MPR_{f,e}, A\text{-}MPR_{f,e})+\Delta MB_{P,n}$ according to a scheduled waveform, a starting position and number of resource blocks (RBs), and additional NS requirements. If $\max(MPR_{f,e}, A\text{-}MPR_{f,e})+\Delta MB_{P,n}=9$ dB, and a preset trigger condition is P-MPR>$\max(MPR_{f,e}, A\text{-}MPR_{f,e})+\Delta MB_{P,n}$, it can be seen that the P-MPR value does not need to be reported, and thus the P-MPR value may not be included when reporting the PHR. If $\max(MPR_{f,e}, A\text{-}MPR_{f,e})+\Delta MB_{P,n}=4$ dB, it is determined that the P-MPR value needs to be reported according to the preset trigger condition, and the value to be reported is the P-MPR value=6 dB, if the granularity is 0.5 dB, the specific report format can be shown in FIG. 5; and if the granularity is 1 dB, the specific report format can be shown in FIG. 6.

Figure 7:
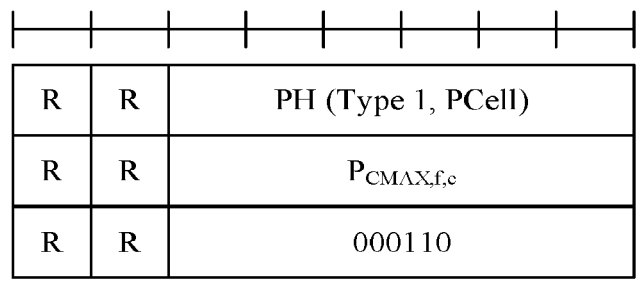
FIG. 7 is a schematic diagram illustrating a report format with a granularity of 0.5 dB and a difference of 3 dB according to an exemplary embodiment.
Figure 8:
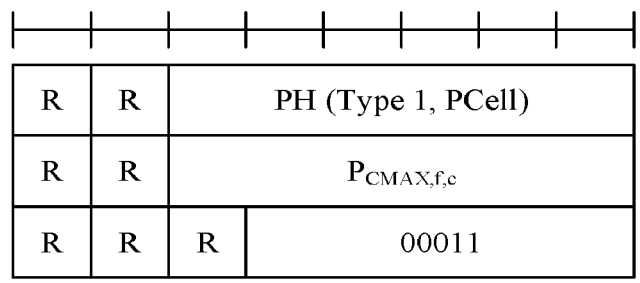
FIG. 8 is a schematic diagram illustrating a report format with a granularity of 1 dB and a difference of 3 dB according to an exemplary embodiment.

In a certain communication, the UE determines that the P-MPR value required by the beam according to the service type and the usage scenario is equal to 12 dB. The UE determines max(MPR$_{f,e}$, A-MPR$_{f,e}$)+$\Delta$MB$_{P,n}$ according to the scheduled waveform, the starting position and number of the RBs, and additional NS requirements. If max(MPR$_{f,e}$, A-MPR$_{f,e}$)+$\Delta$MB$_{P,n}$=9 dB, and the preset trigger condition is P-MPR>max(MPR$_{f,e}$, A-MPR$_{f,e}$)+$\Delta$MB$_{P,n}$, it can be seen that the P-MPR value needs to be reported. In this embodiment, the P-MPR value is not reported directly, but reported according to a result of the calculation formula P-MPR−(max(MPR$_{f,e}$, A-MPR$_{f,e}$)+$\Delta$MB$_{P,n}$), that is, 12−9=3 dB. For example, taking 0.5 dB as the granularity, if the P-MPR value is represented by 6 bits in the report format of the P-MPR, P-MPR=3 dB can correspond to P-MPR_6, and the representation of the bit is shown in FIG. 7. Specifically, the P-MPR value=3 dB is represented as 000110. For example, taking 1 dB as the granularity, if the P-MPR value is represented by 5 bits in the report format of the P-MPR, the P-MPR value=3 dB can correspond to P-MPR_3 in Table 2, and the representation of the bit is shown in FIG. 8. Specifically, the P-MPR value=3 dB is represented as 00011.

In a certain communication, the UE determines the P-MPR value required by the beam according to the service type and the usage scenario, for example, the P-MPR value=6 dB. The preset trigger condition is whether the P-MPR value is larger than P0, where P0 is a fixed value, such as 3 dB. The UE determines whether the P-MPR value is larger than P0, if the P-MPR value is larger than P0, the report of the PHR information including the P-MPR value is triggered, the specific format is shown in FIG. 3 or FIG. 4.

It should be understood that the report formats shown in FIG. 3 to FIG. 8 are alternative specific implementations, and the present disclosure is not limited thereto.

It should also be understood that the report formats shown in FIG. 3 to FIG. 8 are only to illustrate the embodiments of the present disclosure, and those skilled in the art can make various obvious changes and/or substitutions based on the examples of FIG. 3 to FIG. 8, while the obtained technical solution remains within the scope of the embodiments of the present disclosure.

Figure 9:
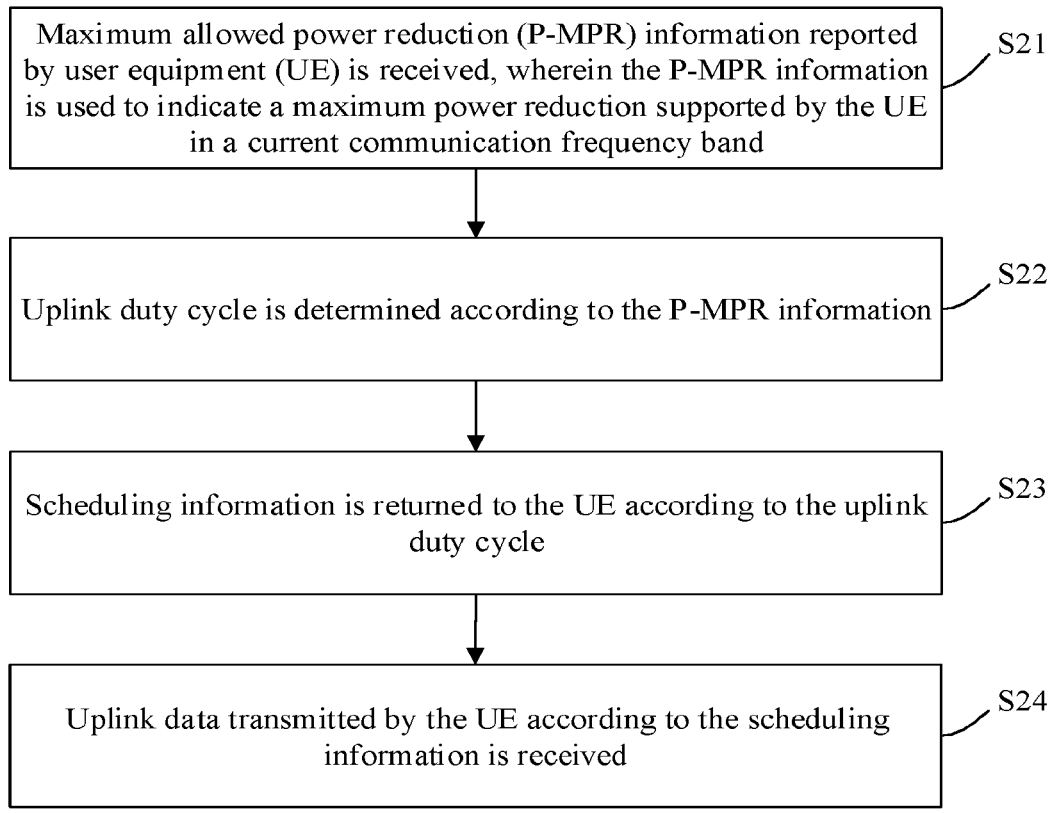
FIG. 9 is a flowchart illustrating another method for uplink data transmission according to an exemplary embodiment.

FIG. 9 is a flowchart illustrating another method for uplink data transmission according to an exemplary embodiment. As shown in FIG. 9, the method for uplink data transmission is performed by a base station and includes following steps.

In step S21, maximum power reduction (P-MPR) information reported by a user equipment (UE) is received, wherein the P-MPR information is configured to indicate a maximum power backoff supported by the UE in a current communication frequency band.

In step S22, an uplink duty cycle is determined according to the P-MPR information.

In step S23, scheduling information is returned to the UE according to the uplink duty cycle.

In step S24, uplink data transmitted by the UE according to the scheduling information is received.

According to the technical solution described in the embodiment of the present disclosure, the base station can determine the scheduling information for the UE according to the P-MPR information reported by the UE, so that the UE can transmit the uplink data according to the scheduling information, thereby facilitating the UE to meet the requirements of the MPE more easily. Compared with the existing solution in which UE does not report the P-MPR information, the problems of serious insufficient uplink coverage and even sudden failure of the communication link caused by the relatively great power reduction, which is determined by the base station without knowing the maximum power reduction of the UE, can be avoided.

In some embodiments, the P-MPR information includes a P-MPR value. That is, the UE can report the P-MPR value to the base station when reporting the P-MPR information to the base station, so that the base station can determine the scheduling information according to the P-MPR value.

In some embodiments, the P-MPR information includes:
a difference between the P-MPR value and a reference power reduction value.

That is, the UE can report the difference between the P-MPR value and the reference power reduction value to the base station when reporting the P-MPR information to the base station, so that the base station can determine the scheduling information according to the difference.

In some embodiments, receiving the P-MPR information reported by the UE includes receiving a power headroom reporting (PHR) message which carries the P-MPR information; and determining the P-MPR information from a perset information field in the PHR message. In this way, signaling overhead can be saved by reporting the P-MPR information through the PHR message.

In some embodiments, the perset information field includes:
an information bit for indicating a P-MPR value or a difference between a P-MPR value and a reference power reduction value; and a reserved bit.

In some embodiments, receiving the P-MPR information reported by the UE includes receiving the P-MPR information periodically reported by the UE. In this way, it is convenient for the base station to determine the scheduling information for the UE according to the P-MPR information periodically reported by the UE.

In some embodiments, receiving the P-MPR information reported by the UE includes receiving the P-MPR information reported by the UE to the base station in a case where a preset trigger event is satisfied. In this way, it is convenient for the base station to determine the scheduling information for the UE according to the P-MPR information reported by the UE to the base station in response to determining that the preset trigger event is satisfied.

In an implementation, the preset trigger event includes: a P-MPR value included in the P-MPR information is larger than or equal to a first preset threshold.

As an example, the first preset threshold is a fixed value.

As an example, the first preset threshold is the reference power reduction value.

The reference power reduction value is determined according to a maximum power reduction value MPR$_{f,e}$ satisfying a first transmission requirement of a current carrier and a cell, a maximum power reduction value A-MPR$_{f,e}$ satisfying a second transmission requirement of the current carrier and the cell, and a power reduction value scaling factor $\Delta$MB$_{P,n}$ for the current communication frequency band in a plurality of supported frequency bands.

Here, the first transmission requirement can be understood as a general requirement specified in a communication standard, that is, a requirement that all UEs must meet if there is no special requirement given by network signaling (NS).

Here, the second transmission requirement can be understood as a transmission requirement given by the network signaling.

As an example, a calculation formula of the reference power reduction value is:

$$\max(MPR_{f,e}, A\text{-}MPR_{f,e}) + \Delta MB_{P,n},$$

where $MPR_{f,e}$ represents the maximum power reduction value satisfying the first transmission requirement of the current carrier and the cell, $A\text{-}MPR_{f,e}$ represents the maximum power reduction value satisfying the second transmission requirement of the current carrier and the cell, $\Delta MB_{P,n}$ represents the power reduction value scaling factor in the current communication frequency band for the current communication frequency band in a plurality of supported frequency bands, and P represents an effective isotropic radiated power (EIRP) peak value when the frequency band is n.

In some embodiments, the preset trigger event includes: a difference between the P-MPR value and a reference power reduction value is larger than or equal to a second preset threshold.

As an example, the second preset threshold is a fixed value.

As an example, the second preset threshold is the reference power reduction value.

A calculation formula of the difference is:

$$P\text{-}MPR - (\max(MPR_{f,e}, A\text{-}MPR_{f,e}) + \Delta MB_{P,n}),$$

where P-MPR represents the P-MPR value, $\max(MPR_{f,e}, A\text{-}MPR_{f,e}) + \Delta MB_{P,n}$ represents the reference power reduction value.

$MPR_{f,e}$ represents the maximum power reduction value satisfying the first transmission requirement of the current carrier and the cell, $A\text{-}MPR_{f,e}$ represents the maximum power reduction value satisfying the second transmission requirement of NS of the current carrier and the cell, $\Delta MB_{P,n}$ represents the power reduction value scaling factor for the current communication frequency band in a plurality of supported frequency bands, f represents a subcarrier, c represents the cell, n represents the frequency band, and P represents the EIRP peak value when the frequency band is n.

In some embodiments, determining the uplink duty cycle according to the P-MPR information includes:

obtaining a preset corresponding relationship between P-MPR value and uplink duty cycle when a power headroom reporting (PHR) value is 0 and the P-MPR information includes the P-MPR value; and determining the uplink duty cycle corresponding to the P-MPR value based on the corresponding relationship.

Table 3 shows a corresponding relationship between P-MPR value and uplink duty cycle when the P-MPR value is represented by 6 bits and PHR=0 in the report format.

TABLE 3

| P-MPR | Duty cycle level |
| --- | --- |
| 0 | X0 |
| 1 | X1 |
| ... | ... |
| n | Xn |
| ... | ... |
| 63 | X63 |

Table 4 shows a corresponding relationship between P-MPR value and uplink duty cycle when the P-MPR value is represented by 5 bits and PHR=0 in the report format.

TABLE 4

| P-MPR | Duty cycle level |
| --- | --- |
| 0 | X0 |
| 1 | X1 |
| ... | ... |
| n | n |
| ... | ... |
| 31 | X31 |

It should be noted that, the method by which the base station determines a maximum supported uplink duty cycle when PHR=0 according to the P-MPR value reported by the UE can also be other methods such as linear interpolation, which will not be repeated here.

In some embodiments, determining the uplink duty cycle according to the P-MPR information includes:

determining a maximum value of 100% and a reference uplink duty cycle as the uplink duty cycle when a power headroom reporting (PHR) value is not 0 and the P-MPR information includes a P-MPR value.

The reference uplink duty cycle is determined according to an uplink duty cycle level value and the PHR value.

That is, when a current PHR value is not 0, a maximum uplink duty cycle supported by the UE can be calculated according to the following formula:

$$\max(100\%, Xn * 10 / \wedge (PHR/10)),$$

where Xn represents the uplink duty cycle level value, and PHR represents the PHR value.

According to the technical solution described in the present disclosure, the base station receives the P-MPR information reported by the UE, wherein the P-MPR information is configured to indicate a maximum power backoff supported by the UE in a current communication frequency band, determines the uplink duty cycle according to the P-MPR information, returns the scheduling information to the UE according to the uplink duty cycle, and receives the uplink data transmitted by the UE according to the scheduling information. In this way, the base station can determine the scheduling information for the UE according to the P-MPR information reported by the UE, so that the UE can transmit the uplink data according to the scheduling information, thereby facilitating the UE to meet the requirements of the MPE more easily. Compared with the existing solution in which UE does not report the P-MPR information, the technical solution described in the present disclosure can avoid the problems of serious insufficient uplink coverage and even sudden failure of the communication link caused by the relatively great power reduction, which is determined by the base station without knowing the maximum power reduction of the UE.

It should be noted that the method for uplink data transmission is not only suitable for a case of a single carrier, but also suitable for a case of multiple carriers. The terminal can report and process the P-MPR value of each carrier, and the base station can also process different carriers respectively.

Figure 10:
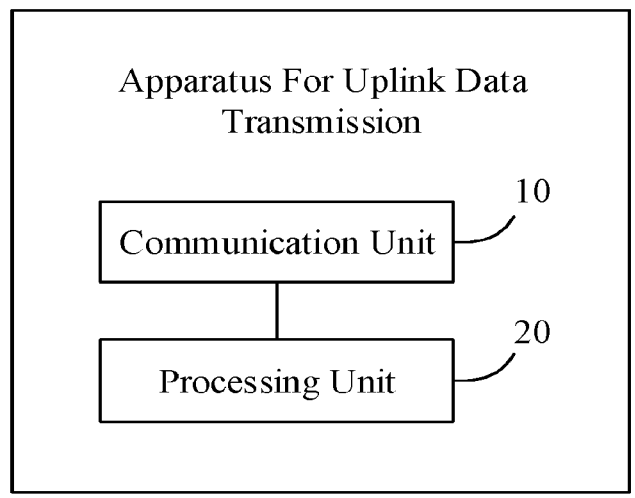
FIG. 10 is a block diagram illustrating an apparatus for uplink data transmission according to an exemplary embodiment.

FIG. 10 is a block diagram illustrating an apparatus for uplink data transmission according to an exemplary embodiment. The apparatus for uplink data transmission is applied in a UE side. Referring to FIG. 10, the apparatus includes a communication unit 10 and a processing unit 20.

The communication unit 10 is configured to report maximum power reduction (P-MPR) information to a base station, wherein the P-MPR information is configured to indicate a maximum power backoff supported by the UE in a current communication frequency band, and receive scheduling information sent by the base station based on the P-MPR information.

The processing unit 20 is configured to transmit uplink data according to the scheduling information.

In the foregoing solution, the P-MPR information includes:
  a P-MPR value, or
  a difference between the P-MPR value and a reference power reduction value.

In some embodiments, the communication unit 10 is configured to:
  report the P-MPR information to the base station with a power headroom reporting (PHR) message which carries the P-MPR information.

In some embodiments, the communication unit 10 is configured to:
  add a perset information field carrying the P-MPR information in the PHR message.

In the foregoing solution, the perset information field includes:
  an information bit for indicating a P-MPR value or a difference between a P-MPR value and a reference power reduction value; and
  a reserved bit.

In some embodiments, the communication unit 10 is configured to: periodically report the P-MPR information to the base station.

In some embodiments, the communication unit 10 is configured to: report the P-MPR information to the base station in a case where a preset trigger event is satisfied.

In the foregoing solution, the preset trigger event includes: a P-MPR value included in the P-MPR information is larger than or equal to a first preset threshold:
  or
  a difference between the P-MPR value and a reference power reduction value is larger than or equal to a second preset threshold.

In the foregoing solution, the P-MPR value is larger than or equal to the first preset threshold includes:
  the P-MPR value is larger than or equal to the reference power reduction value.

In the foregoing solution, the reference power reduction value is determined according to a maximum power reduction value satisfying a first transmission requirement of a current carrier and a cell, a maximum power reduction value satisfying a second transmission requirement of the current carrier and the cell, and a power reduction value scaling factor for the current communication frequency band in a plurality of supported frequency bands.

With respect to the apparatus in the above embodiments, the specific manners for performing operations for individual modules therein have been described in detail in embodiments regarding the methods, which will not be elaborated herein.

In practical applications, specific structures of the above-mentioned communication unit 10 and the processing unit 20 can be realized by a Central Processing Unit (CPU), a Micro Controller Unit (MCU), a Digital Signal Processing (DSP), a Programmable Logic Controller (PLC), or the like in the apparatus for uplink data transmission or the UE to which the apparatus for uplink data transmission belongs.

The apparatus for uplink data transmission described in this embodiment can be disposed in the UE side.

Those skilled in the art should understand that the functions of various processing modules in the apparatus for uplink data transmission of the embodiments of the present disclosure may be understood by referring to relevant descriptions of the above measurement processing method applied in the UE side, and various processing modules in the apparatus for uplink data transmission of the embodiments of the present disclosure may be implemented using analog circuits for performing the functions described in the embodiments of the present disclosure, or by running a terminal including a processor executing instructions corresponding to software for implementing the functions described in the embodiments of the present disclosure.

The apparatus for uplink data transmission described in the embodiment of the present disclosure can meet the requirements of the MPE, and can avoid the problems of serious insufficient uplink coverage and even sudden failure of the communication link caused by the relatively great power reduction determined by the base station without knowing the maximum power reduction of the UE.

Figure 11:
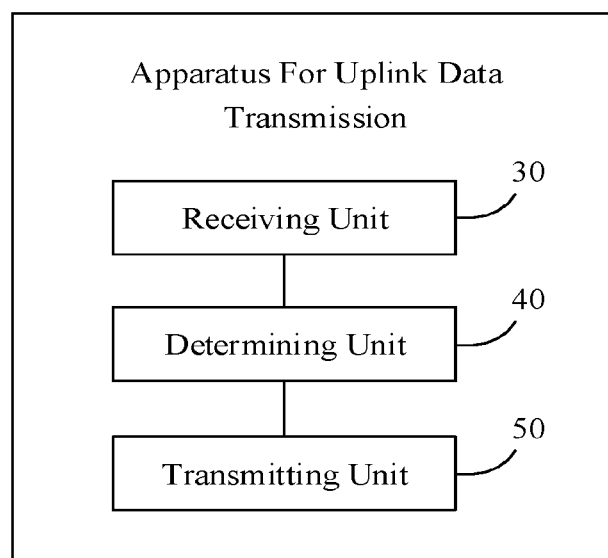
FIG. 11 is a block diagram illustrating another apparatus for uplink data transmission according to an exemplary embodiment.

FIG. 11 is a block diagram illustrating another apparatus for uplink data transmission according to an exemplary embodiment. The apparatus for uplink data transmission is applied in a base station side. Referring to FIG. 11, the apparatus includes a receiving unit 30, a determining unit 40 and a transmitting unit 50.

The receiving unit 30 is configured to receive maximum power reduction (P-MPR) information reported by a user equipment (UE), wherein the P-MPR information is configured to indicate a maximum power backoff supported by the UE in a current communication frequency band.

The determining unit 40 is configured to determine an uplink duty cycle according to the P-MPR information.

The transmitting unit 50 is configured to return scheduling information to the UE according to the uplink duty cycle.

The receiving unit 30 is further configured to receive uplink data transmitted by the UE according to the scheduling information.

In the foregoing solution, the P-MPR information includes:
  a P-MPR value, or
  a difference between the P-MPR value and a reference power reduction value.

In some embodiments, the receiving unit 30 is configured to:
  receive a power headroom reporting (PHR) message which carries the P-MPR information; and
  determine the P-MPR information from a perset information field in the PHR message.

In the foregoing solution, the perset information field includes:
  an information bit for indicating a P-MPR value or a difference between a P-MPR value and a reference power reduction value; and
  a reserved bit.

In some embodiments, the receiving unit 30 is configured to: receive the P-MPR information periodically reported by the UE.

In some embodiments, the receiving unit 30 is configured to: receive the P-MPR information reported by the UE to the base station in a case where a preset trigger event is satisfied.

In the foregoing solution, the preset trigger event includes: a P-MPR value included in the P-MPR information is larger than or equal to a first preset threshold:
  or
  a difference between the P-MPR value and a reference power reduction value is larger than or equal to a second preset threshold.

In the foregoing solution, the P-MPR value is larger than or equal to the first preset threshold includes the P-MPR value is larger than or equal to the reference power reduction value.

In the foregoing solution, the reference power reduction value is determined according to a maximum power reduction value satisfying a first transmission requirement of a current carrier and a cell, a maximum power reduction value satisfying a second transmission requirement of the current carrier and the cell, and a power reduction value scaling factor for the current communication frequency band in a plurality of supported frequency bands.

In some embodiments, the determining unit 40 is configured to: obtain a preset corresponding relationship between P-MPR value and uplink duty cycle when a power headroom reporting (PHR) value is 0 and the P-MPR information includes the P-MPR value; and determine the uplink duty cycle corresponding to the P-MPR value based on the corresponding relationship.

In some embodiments, the determining unit 40 is configured to: determine a maximum value of 100% and a reference uplink duty cycle as the uplink duty cycle when a power headroom reporting (PHR) value is not 0 and the P-MPR information includes a P-MPR value.

In the foregoing solution, the reference uplink duty cycle is determined according to an uplink duty cycle level value and the PHR value.

With respect to the apparatus in the above embodiments, the specific manners for performing operations for individual modules therein have been described in detail in embodiments regarding the methods, which will not be elaborated herein.

In practical applications, specific structures of the above-mentioned receiving unit 30, the determining unit 40 and the transmitting unit 50 can be realized by the CPU, the MCU, the DSP, the PLC, or the like in the apparatus for uplink data transmission or the base station to which the apparatus for uplink data transmission belongs.

The apparatus for uplink data transmission described in this embodiment can be disposed in the base station side.

Those skilled in the art should understand that the functions of various processing modules in the apparatus for uplink data transmission of the embodiments of the present disclosure may be understood by referring to relevant descriptions of the above measurement processing method applied in the base station side, and various processing modules in the apparatus for uplink data transmission of the embodiments of the present disclosure may be implemented using analog circuits for performing the functions described in the embodiments of the present disclosure, or by running a terminal including a processor executing instructions corresponding to software for implementing the functions described in the embodiments of the present disclosure.

The apparatus for uplink data transmission described in the embodiment of the present disclosure can meet the requirements of the MPE, and can avoid the problems of serious insufficient uplink coverage and even sudden failure of the communication link caused by the relatively great power reduction determined by the base station without knowing the maximum power reduction of the UE.

Figure 12:
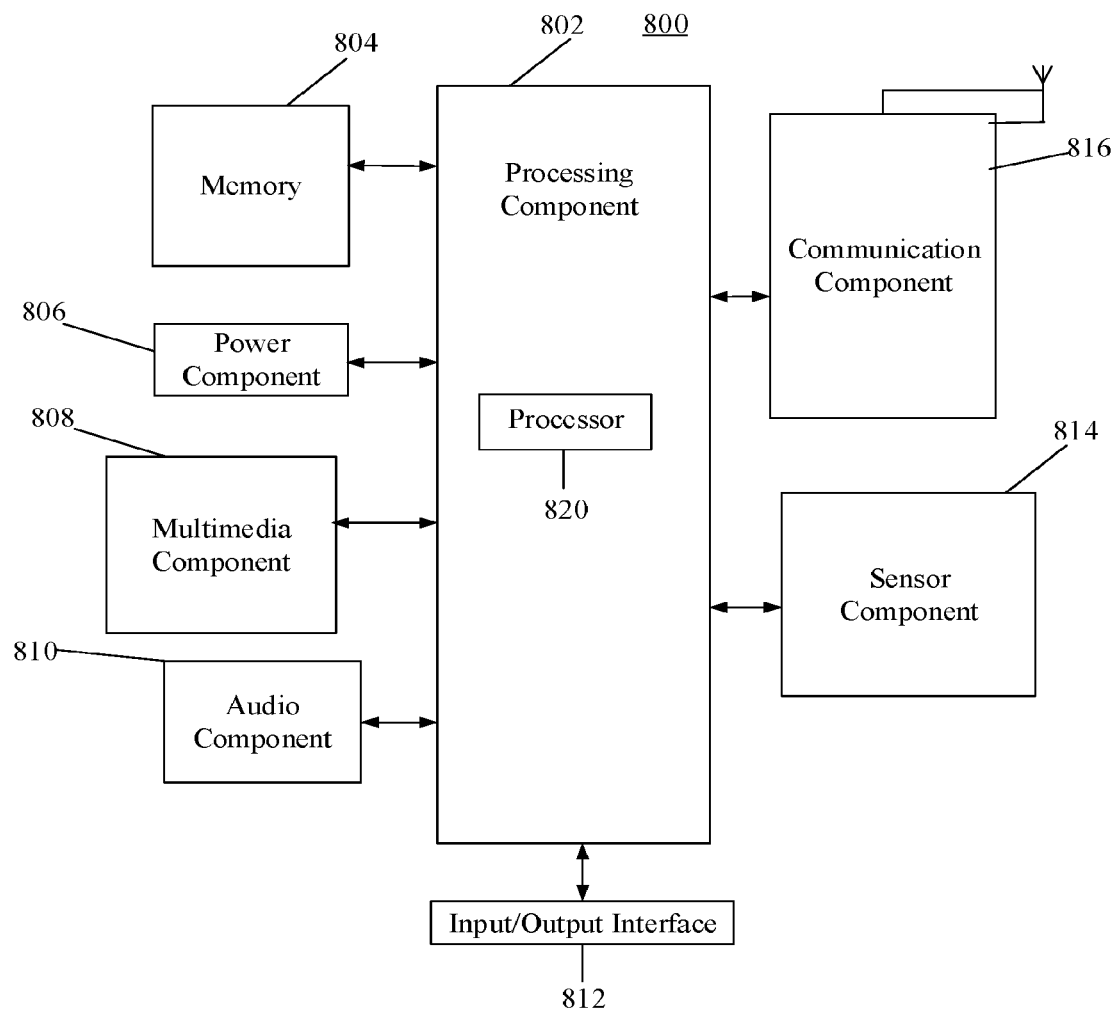
FIG. 12 is a block diagram illustrating an apparatus 800 for uplink data transmission according to an exemplary embodiment.

FIG. 12 is a block diagram illustrating an apparatus 800 for uplink data transmission according to an exemplary embodiment. For example, the apparatus 800 may be a mobile telephone, a computer, a digital broadcasting terminal, a message receiving and transmitting device, a game console, a tablet device, a medical device, a fitness device, a personal digital assistant, and so on.

Referring to FIG. 12, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the apparatus 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is to store various types of data to support the operation of the apparatus 800. Examples of such data include instructions for any application or method operated on the apparatus 800, contact data, phonebook data, messages, pictures, videos, and so on. The memory 804 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 806 provides power to different components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 808 may include a front camera and/or a rear camera. The front camera and/or rear camera may receive external multimedia data when the apparatus 800 is in an operating mode, such as a photographing mode or a video mode. Each of the front camera and the rear camera may be a fixed optical lens system or have focal length and optical zooming capability.

The audio component 810 is configured to output and/or input an audio signal. For example, the audio component 810 includes a microphone (MIC). When the apparatus 800 is in an operating mode, such as a call mode, a recording mode, and a voice recognition mode, the MIC is to receive an external audio signal. The received audio signal may be further stored in the memory 804 or sent via the communication component 816. In some embodiments, the audio component 810 further includes a speaker to output an audio signal.

The I/O interface 812 may provide an interface between the processing component 802 and peripheral interface modules. The above peripheral interface modules may include a keyboard, a click wheel, buttons and so on. These buttons may include, but are not limited to, a home button, a volume button, a starting button and a locking button.

The sensor component 814 includes one or more sensors to provide status assessments of various aspects for the apparatus 800. For example, the sensor component 814 may detect the on/off status of the apparatus 800, and relative positioning of component, for example, the component is a display and a keypad of the apparatus 800. The sensor component 814 may also detect a change in position of the apparatus 800 or a component of the apparatus 800, a presence or absence of the contact between a user and the apparatus 800, an orientation or an acceleration/deceleration of the apparatus 800, and a change in temperature of the apparatus 800. The sensor component 814 may include a proximity sensor to detect the presence of a nearby object without any physical contact. The sensor component 814 may further include an optical sensor, such as a Complementary Metal Oxide Semiconductor (CMOS) or Charge-coupled Device (CCD) image sensor which is used in imaging applications. In some embodiments, the sensor component 814 may further include an acceleration sensor, a gyroscope sensor, a magnetic sensor, a pressure sensor, or a temperature sensor.

The communication component 816 is to facilitate wired or wireless communication between the apparatus 800 and other devices. The apparatus 800 may access a wireless network that is based on a communication standard, such as Wi-Fi, 2G or 3G, or a combination thereof. In an exemplary embodiment, the communication component 816 receives a broadcast signal or broadcast-associated information from an external broadcast management system via a broadcast channel. In an exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method for uplink data transmission applied in the UE side.

In an exemplary embodiment, there is also provided a non-transitory computer-readable storage medium including instructions, such as the memory 804 including instructions. The instructions may be executed by the processor 820 of the apparatus 800 to perform the above described methods. For example, the non-transitory computer-readable storage medium may be a ROM, a Random Access Memory (RAM), a CD-ROM, a magnetic tape, a floppy disk, an optical data storage device, etc.

Figure 13:
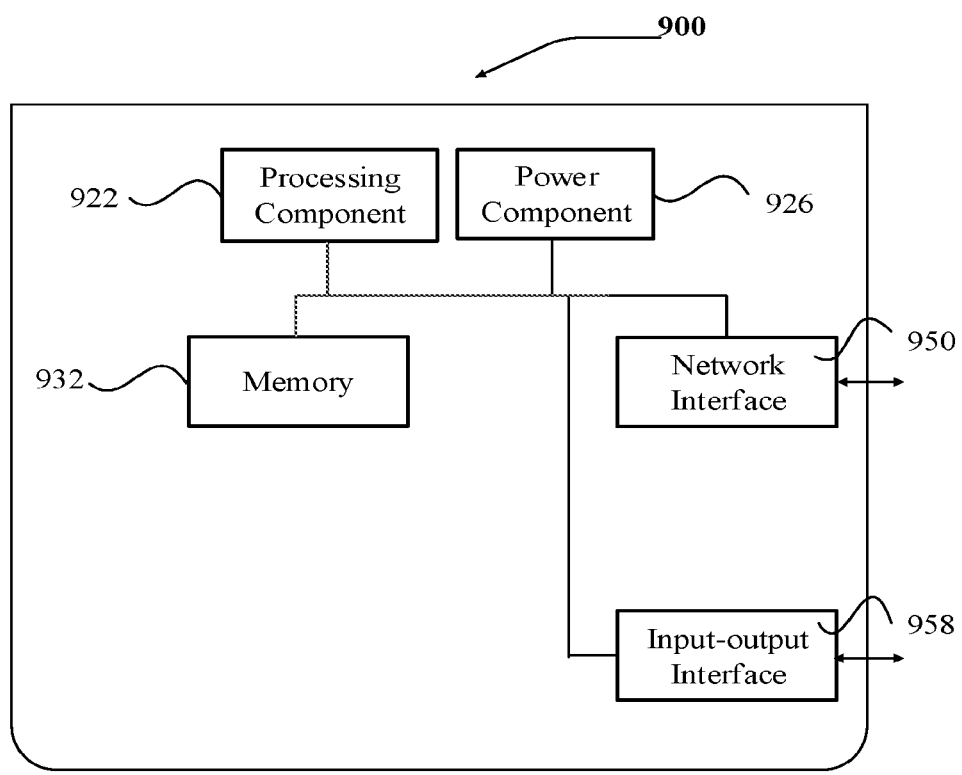
FIG. 13 is a block diagram illustrating an apparatus 900 for uplink data transmission according to an exemplary embodiment.

FIG. 13 is a block diagram illustrating an apparatus 900 for uplink data transmission according to an exemplary embodiment. For example, the apparatus 900 may be provided as a server. Referring to FIG. 13, the apparatus 900 includes a processing component 922, which further includes one or more processors, and a memory resource represented by a memory 932 for storing instructions executable by the processing component 922, such as application programs. The application program stored in the memory 932 may include one or more modules each corresponding to a set of instructions. In addition, the processing component 922 is configured to execute instructions to perform the above method for uplink data transmission applied in the base station side.

The apparatus 900 may also include a power component 926 configured to perform power management of the apparatus 900, a wired or wireless network interface 950 configured to connect the apparatus 900 to the network, and an input-output (I/O) interface 958. The apparatus 900 can operate based on an operating system stored in the memory 932, such as Windows Server™, Mac OS X™, Unix™, Linux™, Free BSD™, or the like.

The technical solutions recorded in the embodiments of the present disclosure may be combined in any combination.

Technical solutions provided by the embodiments of the present disclosure may include following beneficial effects.

By reporting the P-MPR information to the base station, wherein the P-MPR information is configured to indicate the maximum power reduction supported by the UE in the current communication frequency band; receiving scheduling information sent by the base station based on the P-MPR information; and transmitting uplink data according to the scheduling information, the base station can determine the scheduling information for the UE according to the P-MPR information reported by the UE, and then the UE can transmit the uplink data according to the scheduling information, thereby facilitating the UE to meet the requirements of the MPE more easily.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are exemplary only.

It is to be understood that the present disclosure is not limited to the precise structure described above and shown in the accompanying drawings, and that various modifications and changes may be made without departing from the scope thereof.

The invention claimed is:

1. A method for uplink data transmission, performed by a user equipment (UE), comprising:
reporting maximum power reduction (P-MPR) information to a base station, wherein the P-MPR information is configured to indicate a maximum power backoff supported by the UE in a current communication frequency band;
wherein the P-MPR information comprises:
a P-MPR value, or
a difference between the P-MPR value and a reference power reduction value;
wherein reporting the P-MPR information to the base station comprises:
reporting the P-MPR information to the base station with a power headroom reporting (PHR) message which carries the P-MPR information;
wherein reporting the P-MPR information to the base station with the PHR message comprises:
adding a preset information field carrying the P-MPR information in the PHR message,
wherein the preset information field comprises at least one of:

an information bit for indicating a P-MPR value or a difference between a P-MPR value and a reference power reduction value; or a reserved bit.

2. The method according to claim 1, wherein the method further comprises:

receiving scheduling information sent by the base station based on the P-MPR information; and transmitting uplink data according to the scheduling information.

3. The method according to claim 1, wherein reporting the P-MPR information to the base station further comprises:

periodically reporting the P-MPR information to the base station.

4. The method according to claim 1, wherein reporting the P-MPR information to the base station further comprises:

reporting the P-MPR information to the base station in a case where a preset trigger event is satisfied.

5. The method according to claim 4, wherein the preset trigger event comprises:

P-MPR value is larger than or equal to a first preset threshold; or a difference between the P-MPR value and a reference power reduction value is larger than or equal to a second preset threshold.

6. The method according to claim 5, wherein the reference power reduction value is determined according to a maximum power reduction value satisfying a first transmission requirement of a current carrier and a cell, a maximum power reduction value satisfying a second transmission requirement of the current carrier and the cell, and a power reduction value scaling factor for the current communication frequency band in a plurality of supported frequency bands.

7. A method for uplink data transmission, performed by a base station, comprising:

receiving maximum power reduction (P-MPR) information reported by a user equipment (UE), wherein the P-MPR information is configured to indicate a maximum power backoff supported by the UE in a current communication frequency band;

wherein the P-MPR information comprises:

a P-MPR value, or a difference between the P-MPR value and a reference power reduction value;

wherein receiving the P-MPR information reported by the UE comprises:

receiving a power headroom reporting (PHR) message reported by the UE which carries the P-MPR information; and determining the P-MPR information from a preset information field in the PHR message, wherein the preset information field comprises at least one of:

an information bit for indicating a P-MPR value or a difference between a P-MPR value and a reference power reduction value; or a reserved bit.

8. The method according to claim 7, wherein the method further comprises:

determining an uplink duty cycle according to the P-MPR information;

transmitting scheduling information to the UE according to the uplink duty cycle; and receiving uplink data transmitted by the UE according to the scheduling information.

9. The method according to claim 7, wherein receiving the P-MPR information reported by the UE further comprises:

receiving the P-MPR information periodically reported by the UE.

10. The method according to claim 7, wherein receiving the P-MPR information reported by the UE further comprises:

receiving the P-MPR information reported by the UE to the base station in a case where a preset trigger event is satisfied.

11. The method according to claim 10, wherein the preset trigger event comprises:

a P-MPR value is larger than or equal to a first preset threshold; or a difference between the P-MPR value and a reference power reduction value is larger than or equal to a second preset threshold.

12. The method according to claim 11, wherein the reference power reduction value is determined according to a maximum power reduction value satisfying a first transmission requirement of a current carrier and a cell, a maximum power reduction value satisfying a second transmission requirement of the current carrier and the cell, and a power reduction value scaling factor for the current communication frequency band in a plurality of supported frequency bands.

13. The method according to claim 8, wherein determining the uplink duty cycle according to the P-MPR information comprises:

obtaining a preset corresponding relationship between the P-MPR value and uplink duty cycle when a PHR value is 0 and the P-MPR information comprises the P-MPR value; and determining the uplink duty cycle corresponding to the P-MPR value based on the corresponding relationship.

14. The method according to claim 8, wherein determining the uplink duty cycle according to the P-MPR information comprises:

determining a maximum value of 100% and a reference uplink duty cycle as the uplink duty cycle when a PHR value is not 0 and the P-MPR information comprises the P-MPR value.

15. The method according to claim 14, wherein the reference uplink duty cycle is determined according to an uplink duty cycle level value and the PHR value.

16. An apparatus for uplink data transmission, comprising:

a processor; and a memory for storing executable instructions, wherein the processor is configured to execute the executable instructions to:

report maximum power reduction (P-MPR) information to a base station, wherein the P-MPR information is configured to indicate a maximum power backoff supported by the UE in a current communication frequency band;

wherein the P-MPR information comprises:

a P-MPR value, or a difference between the P-MPR value and a reference power reduction value;

wherein reporting the P-MPR information to the base station comprises:

reporting the P-MPR information to the base station with a power headroom reporting (PHR) message which carries the P-MPR information;

wherein reporting the P-MPR information to the base station with the PHR message comprises:

adding a preset information field carrying the P-MPR information in the PHR message, wherein the preset information field comprises at least one of:
- an information bit for indicating a P-MPR value or a difference between a P-MPR value and a reference power reduction value; or
- a reserved bit.

17. An apparatus for uplink data transmission, comprising:
- a processor; and
- a memory for storing executable instructions,
- wherein the processor is configured to execute the executable instructions to implement the method for uplink data transmission according to claim 7.

18. The apparatus according to claim 17, wherein the processor is further configured to:
- periodically report the P-MPR information to the base station.

19. The apparatus according to claim 17, wherein the processor is further configured to:
- report the P-MPR information to the base station in a case where a preset trigger event is satisfied.

20. The apparatus according to claim 19, wherein the preset trigger event comprises:
- a P-MPR value is larger than or equal to a first preset threshold; or
- a difference between the P-MPR value and a reference power reduction value is larger than or equal to a second preset threshold.

* * * * *